A. C. STEWART.
AUXILIARY AIR SUPPLY MEANS FOR INTERNAL COMBUSTION ENGINES.
APPLICATION FILED JULY 25, 1912.
1,064,106.
Patented June 10, 1913.
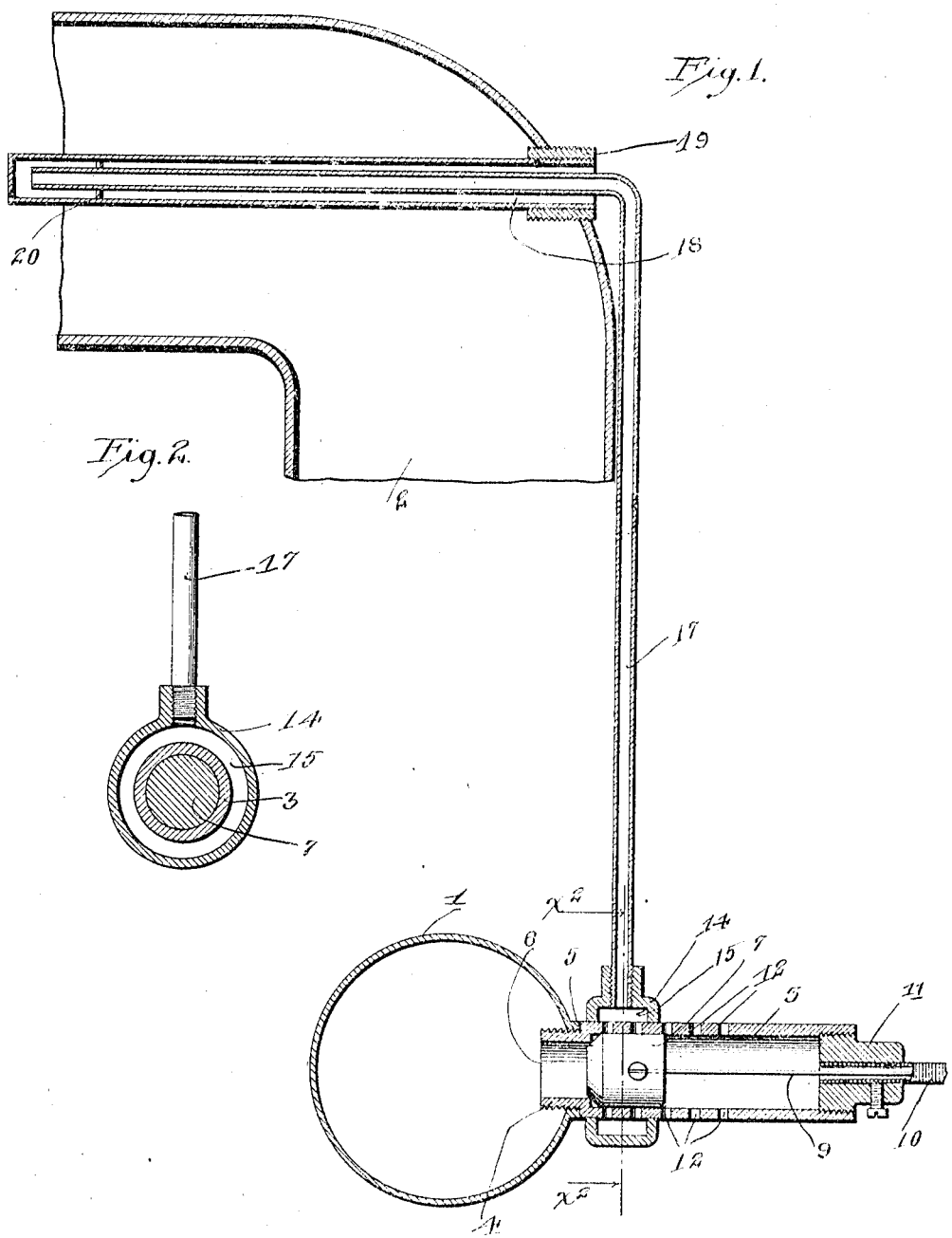
Inventor
Alfred C. Stewart

UNITED STATES PATENT OFFICE.

ALFRED C. STEWART, OF LOS ANGELES, CALIFORNIA.

AUXILIARY-AIR-SUPPLY MEANS FOR INTERNAL-COMBUSTION ENGINES.

1,064,106.  Specification of Letters Patent.  Patented June 10, 1913.

Application filed July 25, 1912. Serial No. 711,579.

*To all whom it may concern:*

Be it known that I, ALFRED C. STEWART, a citizen of the United States, residing at Los Angeles, in the county of Los Angeles and State of California, have invented a new and useful Auxiliary-Air-Supply Means for Internal-Combustion Engines, of which the following is a specification.

This invention relates to means for supplying air to internal combustion engines to supplement the air passing through the carbureter, so as to dilute the mixture when necessary, and the one object of the present invention is to provide means whereby a portion of the auxiliary air may be warmed so as to enable it to take up and vaporize more readily the heavy hydrocarbons of the fuel.

Other objects of the invention will appear hereinafter.

The accompanying drawings illustrate an embodiment of the invention, and referring thereto Figure 1 is a vertical section of the auxiliary air valve and the means for supply of heated air thereto. Fig. 2 is a transverse section on line $x^2-x^2$ in Fig. 1.

1 designates the intake pipe of an internal combustion engine which communicates with the cylinders of the engine in the usual manner, and 2 designates the exhaust manifold or outlet pipe for such engine. The auxiliary air valve is connected to the intake pipe 1 and consists, for example, of a tube 3 having a threaded inner end portion 4 screwing into the intake pipe 1 and provided with a shoulder 5, forming a valve seat for a conical face 6 on a valve plug 7, slidable longitudinally in the tube 3 and operated by any suitable means, for example, by a Bowden wire, the inner member 9 of the Bowden wire being connected to said valve plug 7 and said inner member extending through the outer member or sheath 10 of the Bowden wire which is supported in a plug 11 screwed into the outer end of the tube 3. The tube 3 is perforated as shown at 12, there being preferably a series of perforations or openings distributed along its length, so as to be opened successively by the outward movement of the valve plug 7. A collar 14 extends around the tube 3 and is provided with an annular chamber 15 communicating with any desired number of the perforations 12, for example, the first few rows of perforations nearest to the intake pipe 1, these perforations being those which are first opened in the outward movement of the valve. A pipe 17 communicates with the valve chamber 15 and extends into suitable heating means, for example, the exhaust manifold 2. said pipe 17 extending longitudinally within a tube 18 which extends within the manifold 2, and is secured at its outer end in a bushing or plug 19 screwed into the wall of the manifold. Pipe 18 is open at its outer end and closed at its inner end and the pipe 17 is open at its end which is within the pipe 18, so that air may pass longitudinally into the outer pipe 18 and then back through the inner pipe 17, being heated in its passage by the heat of the exhaust gases of the manifold. Pipe 17 may be supported in pipe 18 by a spider 20.

The operation is as follows: When the auxiliary air valve is closed, the mixture is drawn through the intake pipe 1 from the carbureter in the usual manner, and when the auxiliary valve plug 7 is slightly opened so as to open one or more of the first rows of perforations 12. auxiliary air will be drawn through the pipe 18, pipe 17, annular chamber 15, and perforations 12, into the intake pipe 1, this air being heated in its passage through the pipe 18, and this warm air passing along with the mixture from the carbureter, will tend to more completely vaporize the oil in the mixture. In the first opening of the auxiliary air valve, the effect on the suction through the carbureter is relatively slight, so that there is still a forcible action on the oil, and a considerable proportion of oil is drawn over so that the heating of the air is of value in tending to prevent deposition of the oil. As the auxiliary air valve is further opened, the suction through the carbureter diminishes and the mixture becomes so much poorer that the heating is no longer necessary and the openings 12 which are exposed to the outer air, admit cold air directly from the atmosphere under these conditions.

What I claim is:

1. An auxiliary air supply means for internal combustion engines, comprising in combination with the intake pipe of the engine, a valve tube connected to said intake pipe, and provided with a plurality of openings, a valve plug sliding in said tube and adapted to successively open said openings, and with an air inlet chamber communicating with an opening in the valve which is first opened by the auxiliary valve plug, the opening in said valve tube which is last opened being open to the outer air, and means for supplying heated air to said chamber.

2. An auxiliary air supply means for internal combustion engines, comprising in combination with the intake pipe of the engine, a valve tube connected to said intake pipe, and provided with a plurality of openings, a valve plug sliding in said tube and adapted to successively open said openings, and with an air inlet chamber communicating with openings in the valve which are first opened by the auxiliary valve plug, the openings in said valve tube which are last opened being open to the outer air, means for supplying heated air to said chamber, comprising a pipe extending within the exhaust means of the engine and open to the outer air, and a pipe extending into and connecting with the last named pipe and connected to the air inlet chamber.

In testimony whereof, I have hereunto set my hand at Los Angeles, California, this 12th day of July 1912.

ALFRED C. STEWART.

In presence of—
ARTHUR P. KNIGHT,
MARTHA M. LANGE.